(12) United States Patent
Chambon et al.

(10) Patent No.: US 6,299,821 B1
(45) Date of Patent: *Oct. 9, 2001

(54) MELT EXTRUSION PROCESSES AND FILMS PRODUCED THEREBY

(75) Inventors: Francois H. Chambon, Houston, TX (US); Yves Demay, Villefranche; David Silagy, Evreux, both of (FR); Stefan B. Ohlsson, Keerbergen (BE); Jean-Francois Agassant, Vilabonne (FR)

(73) Assignee: ExxonMobil Chemical Patents Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/864,420

(22) Filed: May 28, 1997

Related U.S. Application Data

(60) Provisional application No. 60/018,520, filed on May 28, 1996.

(51) Int. Cl.⁷ .................................................. B29C 41/00
(52) U.S. Cl. .......................... 264/556; 264/348; 264/345; 264/346
(58) Field of Search .............................. 264/212, 25, 216, 264/235, 348, 346, 556, 345, 234

(56) References Cited

U.S. PATENT DOCUMENTS

| | | |
|---|---|---|
| 3,510,313 | 5/1970 | Steinkraus . |
| 3,867,553 | 2/1975 | Hitze . |
| 4,214,007 | 7/1980 | Hase . |
| 4,333,955 | 6/1982 | Murata et al. . |
| 4,859,379 | 8/1989 | Chiang . |
| 4,900,578 | 2/1990 | Baker . |
| 5,272,016 | 12/1993 | Ralph . |

FOREIGN PATENT DOCUMENTS

| | | |
|---|---|---|
| 0 292 336 A | 11/1988 | (EP) . |
| 0 351 744 A | 1/1990 | (EP) . |
| 0 634 443 A | 1/1995 | (EP) . |
| 193673 | 3/1984 | (HU) . |
| WO 95 01250 A | 1/1995 | (WO) . |
| WO 96 31348 A | 10/1996 | (WO) . |

OTHER PUBLICATIONS

"Study Of The Stability Of The Film Casting Process," Silagy, et al, Polymer Engineering & Science, vol. 36, No. 21, p. 2614–2625, (1996).

"Advantages Of Metallocene Ethylene Polymer Resin Blends In Blown And Cast Films," Research Disclosure, No. 376, p. 565–573 (1995).

*Primary Examiner*—Merrick Dixon
(74) *Attorney, Agent, or Firm*—Stephen D. Prodnuk; William G. Muller

(57) ABSTRACT

The invention relates to a process for melt extruding a film layer of a thermoplastic olefin which comprises extruding the film having physical characteristics under process conditions selected by reference to the Draw ratio Dr and the Aspect ratio A such that draw resonance is avoided in which in addition the process conditions are defined by reference to the Deborah number such that the molten polymer is extruded at a Draw ratio of at least 30 in a high elasticity region at a $\lambda_c$ value of characteristic time as defined herein of from 0.001 to 0.6 s, a Deborah number as defined herein in excess of 0.005 and an A value as defined herein lower than 0.8. Narrower ranges of these parameters may be defined for application of the invention to different polymer types.

7 Claims, 2 Drawing Sheets

• Highly elastic melts break (at P);
poorly elastic melts "draw-resonate" at Q

- Highly elastic melts break (at P); poorly elastic melts "draw-resonate" at Q

MELT EXTRUSION PROCESSES AND FILMS PRODUCED THEREBY

CROSS-REFERENCE TO RELATED APPLICATIONS

This application claims the benefit of U.S. Provisional Application No. 60/018,520, filed May 28, 1996.

BACKGROUND OF THE INVENTION

1. Field of the Invention

The invention relates to improved melt extrusion processes and the films produced thereby. The invention relates especially but not exclusively to melt extrusion processes designed to provide improved operating conditions and/or improved film properties.

2. Background Information

Melt processing conditions are conventionally thought to be constrained by phenomena such as draw resonance which leads to a variation in the draw ratio; sharkskin or surface melt fracture; or breaking of the molten portion of the film connecting the solidified film portion and the die gap. These phenomena have generally led to a limitation of the melt processing speed, of the thickness and of the degree of orientation which could be achieved in the resulting films.

The industry has tried to alleviate these problems in a variety of ways including the inclusion of additives to improve surface melt fracture, the blending with a branched polymer such as LDPE and other polymeric or oligomeric components, as well as by modification of the extrusion apparatus using additional draw off rollers.

One route to improve draw resonance behavior is to provide the polymer itself with more elastic behavior by branching or modification of the polymer as described for example in Dow U.S. Pat. No. 5,272,236, U.S. Pat. No. 5,278,272, and EP-608369-A1. Low draw ratios are however used.

Ways of avoiding the various adverse processing phenomena are described in our co-pending patent application WO93/31348. The disclosure addresses ways of avoiding unstable draw resonance zones by appropriate control of the Draw or stretch ratio, Dr, and of the Aspect ratio, A. WO93/31348 did not disclose how additional control can be exercised to place basically non- or low elasticity molten polymer fluids into regions where they exhibit more elastic behavior.

All the art disclosed in the above prior published applications and patents appears to be of lesser relevance, and is incorporated herein by cross reference and will not be discussed in detail herein.

The invention provides means of reaching and operating in an process envelope where the polymer melt acts elastically, even when the polymer is initially of a non- or low-elasticity type. The novel operating envelope which can be reached enables polymer films to be made which have surprising physical properties and can be made at high line speeds.

BRIEF SUMMARY OF THE INVENTION

According to a broad aspect of the invention there is provided a process for melt extruding a film layer of a thermoplastic olefin which comprises extruding the film having physical characteristics under process conditions selected by reference to the Draw ratio Dr and the Aspect ratio A such that draw resonance is avoided characterized in that in addition the process conditions are defined by reference to the Deborah number such that the molten polymer is extruded at a Draw ratio of at least 30 in a high elasticity region at a $\lambda_c$ value of characteristic time as defined herein of from 0.001 to 0.6 s, a Deborah number as defined herein in excess of 0.005 and an A value as defined herein lower than 0.8.

DETAILED DESCRIPTION OF THE INVENTION

According to a first detailed aspect of the invention there is provided a process for melt extruding a film layer of a polyolefin comprising at least 50 wt %, preferably at least 80 wt % of ethylene derived units which process comprises extruding the film having physical characteristics under process conditions selected by reference to the Draw ratio, Dr, and the Aspect ratio, A, such that draw resonance is avoided characterized in that in addition the process conditions are defined by reference to the Deborah number, De, such that the molten polymer is extruded at a Draw ratio of at least 30 in a high elasticity region at a $\lambda_c$ value of characteristic time as defined herein of from 0.005 to 0.2 seconds at 260° C., a Deborah number as defined herein in excess of 0.005 and an A value as defined herein lower than 0.8, preferably less than 0.2.

According to a second detailed aspect of the invention there is further provided a process for melt extruding a film layer of a polyolefin comprising at least 50 wt %, preferably at least 80 wt % of propylene derived units which process comprises extruding the film having physical characteristics under process conditions selected by reference to the Draw ratio, Dr, and the Aspect ratio, A, such that draw resonance is avoided characterized in that in addition the process conditions are defined by reference to the Deborah number, De, such that the molten polymer is extruded at a Draw ratio of at least 30 in a high elasticity region at a $\lambda_c$ value of characteristic time as defined herein of from 0.001 to 0.6 and especially 0.002 to 0.4 seconds at 260° C., a Deborah number as defined herein in excess of 0.005 and an A value as defined herein lower than 0.8, preferably less than 0.2.

Figure 3:
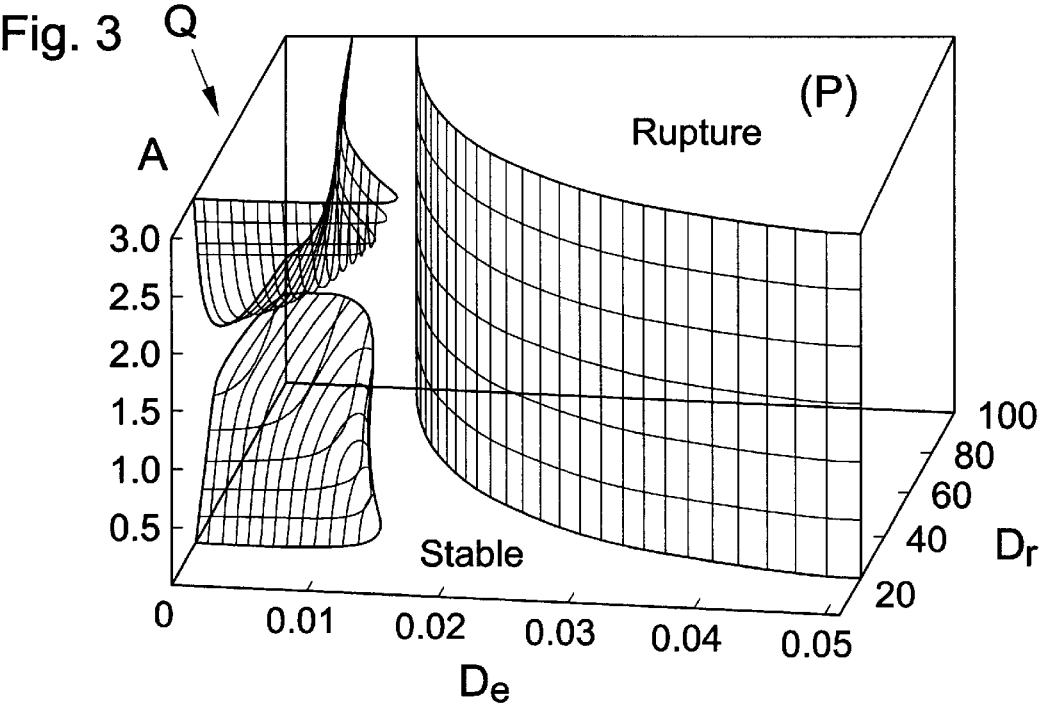
FIG. 3 is a 3-dimensional plot of the above variables to illustrate the extended operating envelope employed in the invention.

The parameters De, Dr and A used to define and select the extrusion conditions are defined herein in detail by reference to the drawings, see FIG. 3. They are dimensionless. $\lambda_c$ is expressed in seconds and changes with temperature.

The draw ratio essentially describes the intensity of the extrusion or drawing process and thereby the extent to which the cross-section of the extrudate is reduced below that of the extrusion die orifice. The invention permits operation at very high draw ratios and hence also at high line speeds. The invention gives a relatively thin cross-section product after extrusion is completed. As to the spatial arrangement or geometry of the extrusion machinery, the high draw ratio at high extrusion speeds is associated with a small airgap (the distance between the extrusion orifice and the location where the extrudate is solidified, such as the cooling drum surface in the cast film process). The airgap is represented in the defining formulae which follow by "X". For a cast extrusion process the Draw ratio is defined to be the ratio of the film velocity at the chill roll to the film velocity at the die exit, i.e. Uf/Uo. The Draw ratio approximates the ratio of the initial film thickness at the die orifice to the thickness of the extruded film.

The Aspect ratio represents in more defined form the geometry of the extrusion process. Apart from the airgap X, the Aspect ratio is inversely proportional to the width of the die represented by half the die width "Lo" in the formulae. The Aspect ratio is the ratio of X and Lo. For cast extrusion the airgap height is taken from the die exit to the contact point between the polymer web and the chill roll. It may be measured with a caliper. The invention is preferably at low aspects ratios and is associated with small airgaps X. The consequence of the practice of the invention is that an extruded film becomes considerably thinner upon extrusion by the high draw ratio but that its width is not reduced (the phenomenon referred to often as neck-in) by anywhere near the same amount because of the small airgap. In other words the high draw ratio leads primarily to a desirable reduction in the thickness of the extruded layer.

The Deborah number De includes as a parameter $\lambda_c$ and so is proportional with the elasticity displayed by the extruded material under the prevailing extrusion conditions. The Deborah number also includes as a parameter the extrusion speed Uo. The $\lambda_c$ and extrusion speed parameters combine in the invention to give a high line speed for extrusion in a more elastic area of rheological polymer behavior. The $\lambda_c$ value can be determined by the methodology described in the prior published WO96/31348 and is then referred to as the old $\lambda_c$ value. However, the invention can be better defined to achieve its purpose of stable operation at high speed by defining the $\lambda_c$ parameter differently; it is then referred to as the new $\lambda_c$ value.

The new $\lambda_c$ value is determined by fitting the curve of the dynamic viscosity, $\eta^*$, vs. frequency of oscillation, $\omega$, with a modified Cross equation (Cross, 1966), such that:

$$\eta^*(\omega) = \frac{\eta_0}{1 + (\lambda_c \omega)^m}$$

where $\eta_0$ is the zero-shear rate viscosity and m a power law index. The Cross equation is applied to the results of the dynamic measurements described in WO 96/31348, p5. The resulting characteristic time, is the reciprocal of the frequency that corresponds to the transition from Newtonian to power-law regimes.

For the purpose of material characterization the frequency span over which the fit is carried out must be of about the same length for the set of polymers to be compared and is typically from 0.01 to 250 rad/s.

The fitting is done using the Innovative Rheological Interface software (IRIS registered Trade mark) version 5.0 developed at the University of Massachusetts Amherst, USA by Winter and co-workers. For the purposes of this invention, $\lambda_c$ is a direct output of "general data regression module" in the IRIS software.

Preferably De is from $De_{min} < De < De_{max}$, where $De_{min}$ and $De_{max}$ are lower and upper bounds for the Deborah number. These are defined as:

$$De_{min} = \frac{b - \sqrt{b^2 - 4(0.5 + 3 \times 10^{-2} Dr - 3.6 \times 10^{-4} Dr^2 - A)a}}{2a}$$

and $$De_{max} = \frac{1}{Dr - 1},$$

with $b = 31Dr - 596 - 0.37Dr^2$, $a = 5020Dr - 1.1 \times 10^5 - 57,5Dr^2$ for $40 \leq Dr \leq 100$ and $A \leq 1$.

The modified definition of $\lambda_c$ helps to better define the stable operating envelope for the invention. For a given Draw ratio, the stretching force increases while the Deborah number increases. The extrusion can be that of a self supporting film or of a layer in a multilayer film, the other layers of which may or may not be extruded under the conditions arising out of the invention.

Suitably if the polymer comprises predominantly ethylene derived units, has a Melt Index, as measured by ASTM 1238, condition E, ("MI") of 30 g/10 min or less, preferably 20 g/10 min or less, even more preferably 8 g/10 min or less, even more preferably 4 g/10 min or less. Preferably the MI is at least 0.2, especially at least 0.5. The characteristic time, $\lambda_c$, of 0.005 seconds at 260C, more preferably 0.01 and drawing said polyolefin at a draw ratio Dr of 30 or more, preferably 35 or more and using an aspect ratio A of 0.8 or less, preferably 0.2 or less.

Preferably the polyolefin is a polyethylene copolymer having a density of from 0.90 to 0.94, especially 0.910 to 0.935, a melt index of from 0.2 to 20, especially from 0.5 to 15 and a molecular weight distribution as defined herein of from 1.5 to 6, especially from 2 to 5.

Advantageously the polyethylene copolymer has an Melt Index Ratio (MIR) determined by the ratio of $I_{21}$ over $I_2$ as per ASTM test of less than 35, preferably less than 30 and has a low internal energy of activation. That implies that the polymer is one which will basically be quite low-elastic in behavior under conventional extrusion conditions and which will lack modification, such as long chain branching, to enhance its elasticity during extrusion.

The polymer may also be a polypropylene homo or copolymer having a melt flow rate determined by an ASTM test of from 1 to 30 especially from 4 to 20. The relaxation time or the characteristic time which is synonymous at 260° C. is from 0.001 to 0.6 seconds especially from 0.02 to 0.4 seconds.

Preferred ethylene based polymers that may be processed according to the invention preferably have a characteristic time of 0.005 seconds at 260C or less. Examples include all polymers that are drawn during formation into a product. Further examples include but are not limited to polyolefins which are homopolymers or copolymers of $C_2$ to $C_{30}$ a-olefins (for the purpose of this invention ethylene is defined to be an a-olefin). Likewise polyolefins such as linear low density polyethylenes, high density polyethylene, very low density polyethylene, narrow molecular weights distribution (Mw/Mn) polymers such as those available under the trade name EXACT™ from Exxon Chemical Company in Houston Texas may be used. Additional preferred polymers that may be processed according to the invention include polymers of polar monomers. Preferred examples include polyesters and copolymers of ethylene or propylene with a polar monomer. Specific preferred examples include nylon polymers, polyethylene terephtalate polymers, ethylene vinyl acetate polymers, polyvinyl chloride polymers, ethylene acrylate polymers and the like.

Particularly preferred examples include Escorene LL-3003 a linear low density polyethylene available from Exxon Chemical Company in Houston, Texas that has a melt index of 3.2 g/10 min and a density of 0.9175 and Exceed ECD350D60 a polyethylene also available from Exxon Chemical Company that has a melt index of 1.0 g/10 min and a density of 0.917.

The invention is adapted for use at and is preferably used at high draw ratios such as a draw ratio as defined herein varies from 40 to 150. The process is especially useful in a cast extrusion process in which the airgap X as herein defined is from 1 to 20 inches, especially from 1.5 to 6 inches.

Conventionally when extrusion lines are to be operated at high line speeds, the desired geometry is established and then slowly the output (amount of film extruded per unit time) and line speed are increased until the target is reached. A considerable part of the operating envelope provided by the invention is best reached by a different method so as to avoid draw resonance instability or other fatal disturbances which would prevent the high line speeds from being reached. Thus preferably the invention also provides a process for starting up a process for melt extruding a polyolefin into a film at a high draw ratio while avoiding instability which comprises the steps of:

a) commencing at a low output of less than 50% of the final target output and a low line speed at less than 60% of the final target line speed;

b) increasing the output towards the target output such that De is increased to between 0.0015 and 0.0028 while changing the line speed by less than 5% towards the final line speed;

c) increasing the line speed without substantially reducing the output to obtain a draw ratio of up to 40; and d) reducing the output to obtain a draw ratio in excess of 40 while De is maintained between De min and De max as herein defined.

Figure 1:
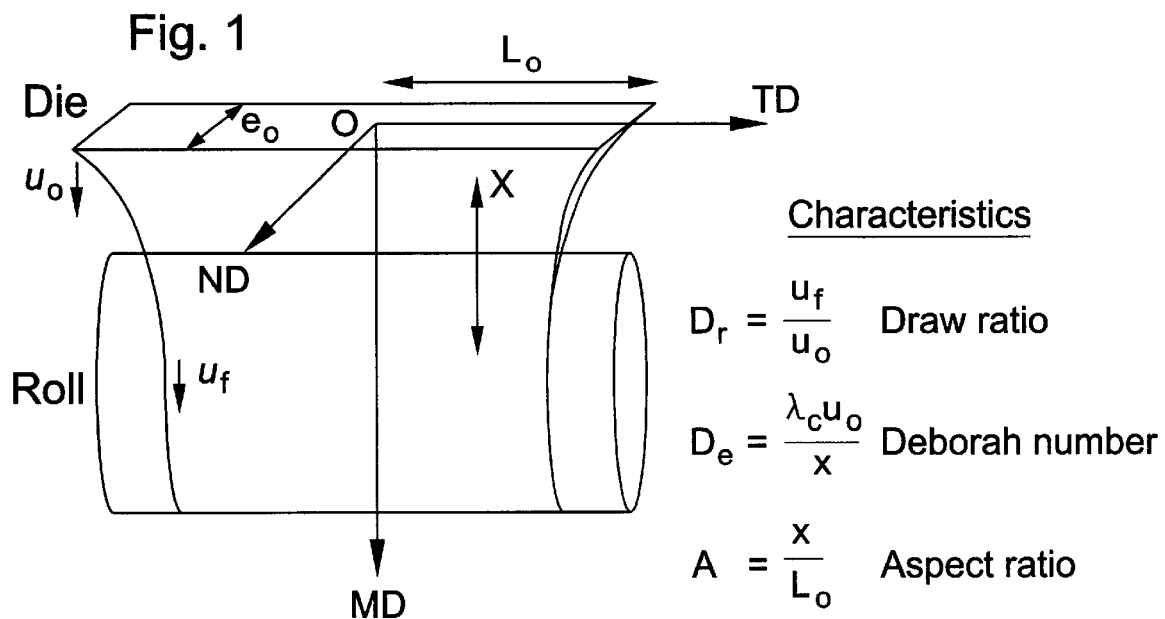
FIG. 1 illustrates the definition of the Draw ratio, Dr, the Aspect ratio, A, and the Deborah number, De, and their constituent terms.
Figure 2A:
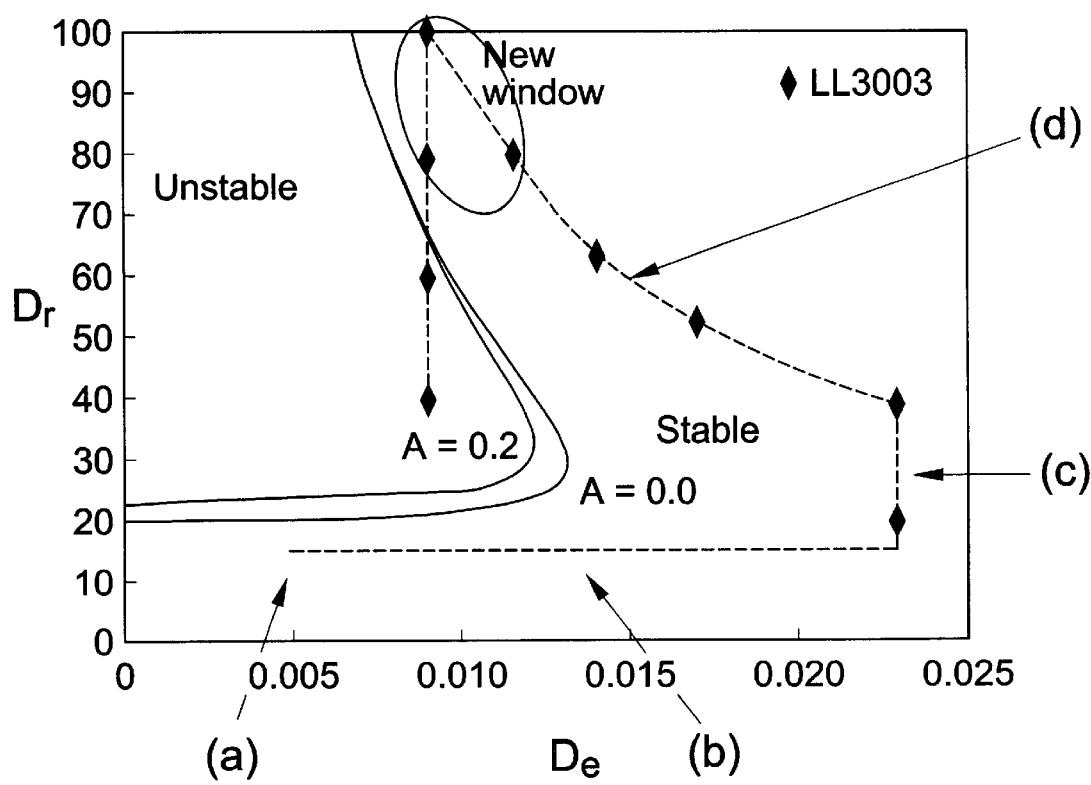
FIG. 2A and 2B shows plots of the variables referred to above in the cast extrusion of certain materials LL-3003 and ECD-350D60 as described in the Examples which follow.
Figure 2B:
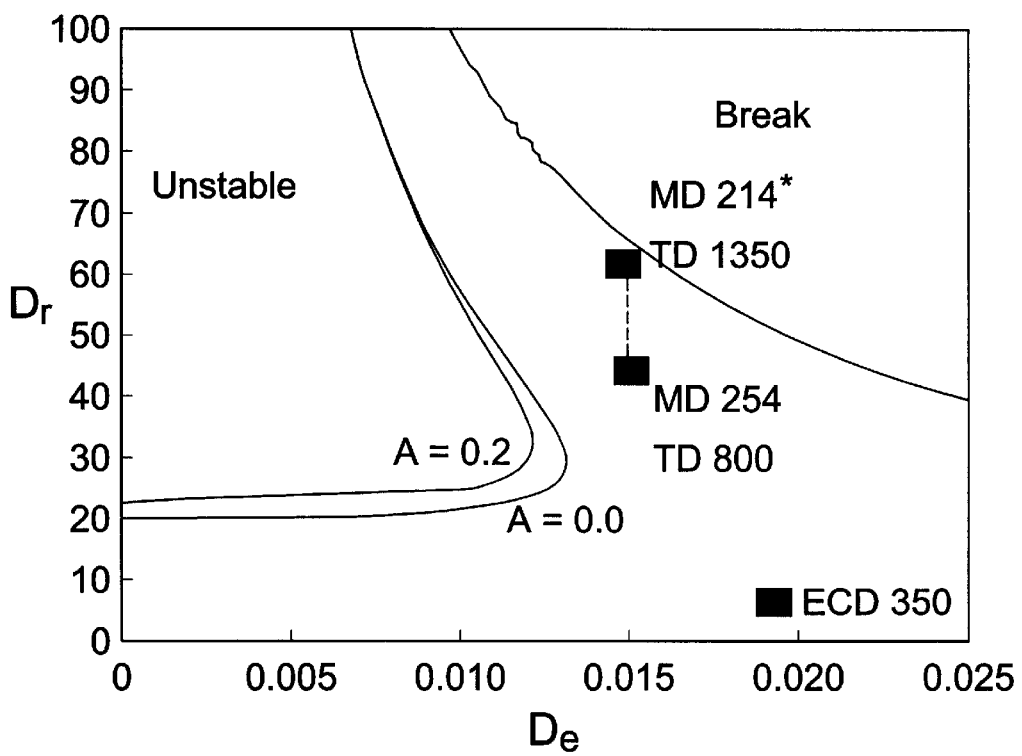

By operating in this way the unstable operating zone and rupture zone in FIG. 2A and 2B as described in the Examples can be avoided while high line speeds and Draw ratios can be reached.

The process of the invention also leads to a film or film layer which has a high degree of orientation in its machine (drawing) direction but has by comparison a low degree of stretch in the transverse direction. This leads in turn to surprisingly high transverse tensile and tear strengths which can be used to obtain a balance of properties not otherwise achievable. The invention thus thirdly provides a film layer prepared by a melt extrusion process which has a thickness of from 3 to 75 microns, a molecular weight distribution of from 2 to 4, and a CDBI as defined herein of from 50 to 90%, which has a machine direction tensile strength as defined herein of from 50 MPa to 120 MPa and a transverse direction tensile strength higher than 45 MPa.

Preferably the transverse direction Elmendorf tear strength is higher than 500 g/mil.

EXAMPLES

The following polymers were melt extruded into film:

a) Escorene LL-3003 a polyethylene derived of ethylene and 1-hexene sold by Exxon Chemical Company having an MI of 3.2 and a density of 0.9175 The grade is made in a gas phase reactor using a titanium chloride catalyst with an aluminum alkyl activator b) EXCEED ECD-350D60 a polyethylene grade sold by Exxon Chemical Company, having an MI of 1.0, a density of 0.917 and made using a metallocene catalyst with methyl alumoxane as activator in a gas phase process using hexene-1 as comonomer.

The polymers were extruded on a Black Clawson cast extruder line in which the extruded film is deposited on a cooled drum under the following conditions:

The die width is 107 cm and the airgap between die orifice and drum surface is 8.1 cm. The extrusion temperature measured in the melt at the extruder exit is 440 and 470° F. for Examples A and B respectively. The air-knife pressure was adjusted to a low 0.1 psi and 0.5 psi for Examples A and B respectively. The chill roll temperature was set and controlled to about 81° F.

The stable region can be reached by the method best explained by reference to FIG. 2A. At (a) in the Figure extrusion is started at a low output of less than 50% of the final target output, actually at 100 lbs/h with the line speed being actually 460 ft/min i.e. less than 60% of the final target line speed. At (b) the output is increased towards the target output increasing the Deborah number to about 0.025 while the line speed is kept at an actual speed of 460 ft/min, less than a 5% change towards the final line speed. At (c) line speed is increased to 938 ft/min, increasing the Draw ratio Dr in the process, without substantially reducing the output so keeping the Deborah number constant to obtain a draw ratio of up to 40. Finally at (d) the output is reduced so decreasing the Deborah number and increasing the Draw ratio to obtain a Draw ratio of 100 well in excess of 40.

Overall the result of the operation is that the polymer is taken past the region in which draw resonance occurs and then the output speed is increased in a manner to avoid the rupture region in which the melt-strength becomes insufficient to maintain the molten portion of the extrudate in the airgap (see FIG. 2B for the rupture region which also exists for FIG. 2A but which is not shown).

The films prepared in the stable operating region had the following characteristics:

TABLE

| | LL-3003 FIG. 2A | ECD350 FIG. 2B | ECD350 FIG. 2B |
|---|---|---|---|
| Draw ratio | 80 | 46 | 61 |
| Output (lbs/h) | 293 | 408 | 408 |
| Line speed (ft/min) | 938 | 500 | 700 |
| Melt temp (° F./° C.) | 440/227 | 470/243 | 470/243 |
| Shrinkage % MD | 84 | 78 | 82 |
| Shrinkage % TD | −41 | −27 | −34 |
| Gauge (average) | 0.41 | 0.86 | 0.65 |
| Elmendorf tear MD | 359 | 254 | 214 |
| Elmendorf tear TD | 737 | 800 | 1350 |
| Oxygen vapor transmission ratio | 894 | 650 | 640 |
| Dart Impact (g/mil) | | 148 | 112 |
| Ultimate tensile strength MD (psi) | | 14390 | 8204 |
| Ultimate tensile strength TD (psi) | | 7157 | 31300 |
| Birefringence | 16.5 | | |

The films show a stress strain behavior which indicates that the plateau region can be controlled at the higher line speeds employed as shown in the figures.

Films of the invention may be less prone to transverse tear failure when placed under longitudinal stretch when used a stretch film layer. The stress strain curve for the film may show a plateau region which is either lowered relative to conventionally extruded films of similar materials or extended so to permit a higher level overall of stretch. The films may also be pre-stretched to a greater extent than hitherto with attendant benefits in pallet stretch film. High pre-stretch levels reduce materials cost while maintaining the holding force for the pallet. The invention can also be used to make primary film which is subsequently post-oriented below the crystalline melting point. Such film would have superior tensile strength and thickness compared to conventionally extruded films.

We claim:

1. A melt extrusion process for a film layer of a thermoplastic polyolefin, the process comprising:

(a) selecting a thermoplastic polyolefin having a characteristic time ($\lambda_c$) determined by fitting a curve of dynamic viscosity ($\eta^*$) vs. frequency of oscillation ($\omega$) such that $$\eta^*(\omega)=\eta_0/1+(\lambda_c\omega)^m,$$

where $\eta_0$ is the zero shear viscosity and m is a power law index, and said $\lambda_c$ is a value of from 0.001 to 0.6 s;

(b) setting the aspect ratio (A) of the air gap length (X) to one-half an extrusion die orifice width ($L_0$) to lower than 0.8, where X is defined as the distance from said die orifice of a melt extruder to the location on a chill roll where extrudate of said polyolefin is solidified;

(c) extruding the film through said extrusion die orifice onto said chill roll while maintaining a ratio (Dr) of film velocity at said chill roll ($u_f$) to film velocity at said die orifice ($u_o$) of at least 30; and d) maintaining the product (De) of said $\lambda_c$ times the ratio of said film velocity at the die orifice ($u_o$) to said air gap length (X) at a value greater than 0.005.

2. The process of claim 1, wherein said polyolefin is a polyethylene copolymer having a density of from 0.90 to 0.94, a melt index of from 0.2 to 20, and a molecular weight distribution of from 1.5 to 6.

3. The process of claim 1, wherein $\lambda_c$ is 0.005 to 0.2.

4. The process of claim 1, wherein in which the polyolefin has a Melt Index Ratio ($I_{21}/I_2$) of less than 35.

5. The process of claim 1, wherein said ratio Dr is from 40 to 150.

6. The process of claim 1, wherein the process is a cast extrusion process in which the air gap length X is from 1 to 20 inches.

7. The process of claim 1, wherein the process is started by:

(a) commencing extrusion where said product De greater than or equal to about 0.005 and where said film velocity at the chill roll ($u_f$) is greater than 0 but less than 60% of a final maintained film velocity at the chill roll;

(b) increasing said product De to between 0.0015 and 0.0028 by increasing the film velocity at said die orifice ($u_o$) while maintaining the film velocity at the chill roll ($u_f$) at about 60–65% of the final maintained film velocity;

(c) increasing the film velocity at the chill roll ($u_f$) without substantially reducing the film velocity at said die orifice ($u_o$) such that the ratio (Dr) of the two velocities ($u_f/u_o$) is up to 40;

(d) reducing the film velocity at the die orifice such that the ratio Dr exceeds 40 and $De_{min}<De<De_{max}$ where $De_{min}=[b-(b^2-4(0.5+3\times10^{-2}\ Dr-3.6\times10^{-4}\ Dr^2-A)a)^{1/2}]/2a$ and
$De_{max}=1/(Dr-1)$,
where $b=31Dr-596-0.37(Dr)^2$ and $a=5020\ Dr-1.1\times 10^5-57.5\ (Dr)^2$.

* * * * *